United States Patent
Shah

[11] Patent Number: 6,047,071
[45] Date of Patent: Apr. 4, 2000

[54] NETWORK-INITIATED CHANGE OF MOBILE PHONE PARAMETERS

[75] Inventor: Bharat Shah, San Diego, Calif.

[73] Assignee: Nokia Mobile Phones, Espoo, Finland

[21] Appl. No.: 08/837,970

[22] Filed: Apr. 15, 1997

[51] Int. Cl.[7] .................................................. H04L 9/00
[52] U.S. Cl. .......................... 380/273; 380/271; 380/247; 380/248; 380/249; 455/410; 455/435; 455/551
[58] Field of Search ..................................... 455/410, 411, 455/433, 435, 458, 551, 33.1; 380/247, 248, 249, 271, 273

[56] References Cited

U.S. PATENT DOCUMENTS

| | | | |
|---|---|---|---|
| 4,993,067 | 2/1991 | Leopold | 380/21 |
| 5,077,790 | 12/1991 | D'Amico et al. | 380/23 |
| 5,146,498 | 9/1992 | Smith | 380/21 |
| 5,252,964 | 10/1993 | Tan et al. | 340/825.48 |
| 5,294,191 | 3/1994 | Gerszberg | 379/59 |
| 5,297,192 | 3/1994 | Gerszberg | 379/59 |
| 5,301,232 | 4/1994 | Mulford | 380/21 |
| 5,381,138 | 1/1995 | Stair et al. | 340/825.44 |
| 5,414,753 | 5/1995 | Ehara | 379/58 |
| 5,551,073 | 8/1996 | Summarco | 455/89 |
| 5,603,084 | 2/1997 | Henry, Jr. et al. | 455/33.1 |
| 5,722,084 | 2/1998 | Chakrin et al. | 455/551 |
| 5,790,952 | 8/1998 | Seazholtz et al. | 455/432 |
| 5,793,866 | 8/1998 | Brown et al. | 380/2 |
| 5,850,445 | 12/1998 | Chan et al. | 380/23 |
| 5,875,394 | 3/1999 | Daly et al. | 455/411 |
| 5,878,339 | 3/1999 | Zicker et al. | 455/419 |
| 5,898,783 | 4/1999 | Rohrbach | 380/49 |
| 5,918,177 | 6/1999 | Corriveau et al. | 455/432 |

OTHER PUBLICATIONS

"Network Initiated OTASP" by Semyon (Simon) Misikovsky, Dec. 4, 1996, Lucent Technologies.

"Over–The–Air Parameter Administration Stage 1 description V1.03" Steve Thomas, Feb. 27, 1997, Telecommunications Industry Association.

*Primary Examiner*—Tod R. Swann
*Assistant Examiner*—Paul E. Callahan
*Attorney, Agent, or Firm*—Brown, Martin, Haller & McClain

[57] ABSTRACT

The procedure for Over-The-Air Parameter Administration (OTAPA) utilizes the over-the-air programming protocol and procedures which support the Over-The-Air Service Provisioning (OTASP) feature in accordance with established industry standards (TIA/EIA/IS-683). The mobile phone is programmed with a service option for changing the NAM parameters including an identification number for this option. The network base station sends a message to the mobile phone using the identification number and, if the mobile phone has OTAPA capability, it responds indicating support. The base station then transmits message telling the mobile station to proceed to the Traffic Channel and inquires whether the encryption mode is enabled, proceeding with the OTAPA only if the encryption mode is enabled. Once on the Traffic Channel, a Parameter Change Code (PCC) is sent. If the PCC is verified by the mobile unit, the base station proceeds to update the parameters and store the updated parameters into the phone's memory. After verification of the programmed data in accordance with OTASP processing, the process is terminated. No user intervention is required to initiate or conduct the OTAPA procedure.

30 Claims, 2 Drawing Sheets

NETWORK-INITIATED CHANGE OF MOBILE PHONE PARAMETERS

FIELD OF THE INVENTION

This invention relates generally to administration of parameters for operation of mobile telephones, and more specifically to a method for maintaining, changing, and/or updating of mobile phone parameters by a network service provider without requiring intervention by the mobile phone user.

BACKGROUND OF THE INVENTION

Over-the-air service provisioning (OTASP) for activation of mobile phones, both cellular and PCS, which allows a network service provider to activate new service without intervention of a third party, such as an authorized dealer, is well known, with established standards provided in Telecommunications Industry Association/Electronics Industries Association Interim Standard 683 (TIA/EIA/IS-683). OTASP enables the service provider to activate a potential subscriber's (mobile user's) mobile phone by downloading the required parameters, e.g., a phone number, over the air to the mobile unit. Since a qualified dealer or service agent is not required to initiate the procedure, service providers have the capability of marketing mobile phones through general merchandise-type retail stores, such as drug stores and discount department stores, rather than specialty electronics stores. OTASP also provides the ability to securely load an authentication key ("A-Key") into the mobile unit to allow validation and confirmation of the identity of the mobile unit to enhance security and reduce the potential for fraudulent use of the network service. OTASP can be initiated only by the user and requires connection to the service provider's customer service center for interaction with a customer service representative.

At the time of activation, in addition to the phone number and security code, values known as Number Assignment Modules (NAMs) are downloaded into the memory of the mobile unit from the base station. The NAMs specify parameters which control wireless network usage, such as preferred mode of operation (analog or digital), shared secret data (SSD), and roaming information, or "Preferred Roaming List". A list of numeric indicators is provided in Appendix F of the TIA/EIA/IS-95-A standard and is incorporated herein by reference. Once this initial programming is completed, because the link is broken, the network service provider has little control of the NAM parameters, unlike equivalent parameters in wired telephone networks. Typically, changes made after initial activation, which can include change of the area code of the phone number, or changes in Preferred Roaming List parameters based upon new service areas and/or new roaming agreements with other network providers, need to be made with intervention of the subscriber—either by initiating communication with the network or by taking the mobile unit to an authorized dealer or service agent. This can result in many of the changes being left undone since the subscriber may be too busy or simply does not want to bother making the effort. Further, improvements in technology are constantly being made which may be appropriate for automatic incorporation into existing services without requiring user input, e.g., changeover from analog to digital service. Another problem resulting from the loss of control of the mobile phone parameters (NAMs) is that the service provider has no means for preventing the purchaser of a phone which the provider subsidized from going to a competitor to have the service transferred prior to the expiration of a contracted minimum subscription period. Thus, situations exist where it may be appropriate or desirable for the network service provider to access the mobile unit to maintain or change parameters within the mobile unit without requiring the involvement of the subscriber.

The capability of making over the air network-initiated changes of mobile station NAMs raises significant concerns regarding security, i.e., interception of the change code, and fraud, including unauthorized changing of parameters, including changing of networks, by competing service providers, a practice often referred to as "slamming". For these reasons, such capabilities have been heretofore unavailable, and the need remains for a secure procedure for making possible over-the-air parameter maintenance and changes.

SUMMARY OF THE INVENTION

It is an advantage of the present invention to provide a means for allowing network-initiated over-the-air access to a mobile station's Number Assignment Module (NAM) without requiring user intervention.

It is another advantage of the present invention to provide means for simplifying the administration of NAM parameters by a network service provider.

Yet another advantage of the present invention is to provide means for preserving security and integrity of NAM parameters to prevent unauthorized access.

In an exemplary embodiment of the present invention, the procedure for Over-The-Air Parameter Administration (OTAPA) utilizes the over-the-air programming protocol and procedures which support the Over-The-Air Service Provisioning (OTASP) feature in accordance with established industry standards (TIA/EIA/IS-683). The mobile phone is programmed with a service option for changing the NAM parameters—the Parameter Administration Service Option (PASO), which includes assignment of a PASO number. The mobile phone will also have one or more parameter change codes (PCCs) in its memory. The network possesses means for determining whether a mobile phone is OTAPA capable. In this procedure, the network base station sends a General Page Message to the mobile phone using the PASO number. After first verifying its identity using the standard Authentication process, if the mobile phone has OTAPA capability, it responds with a Page Response Message, indicating support for the PASO by sending the PASO number. If the mobile station does not support the option, the response will indicate that the option is not available. Once the presence of the option is confirmed, the base station transmits a Channel Assignment Message, telling the mobile station to proceed to the Traffic Channel. For security reasons, the Signaling Message Encryption (SME) is used in the Channel Assignment Message. Use of encryption is enforced, and, where encryption is optional, if the encryption mode is not enabled, the mobile station will enter into the Service Negotiation process on the Traffic Channel and will request the other service option, indicating that the PASO is not supported, or will terminate the call according to the Call Release Procedure.

Once the mobile station is on the Traffic Channel, an OTASP Data Message is sent containing a Parameter Change Code (PCC). If the PCC matches the PCC for the mobile phone, it is verified by the mobile unit, after which it may be used to unlock the mobile station, update the parameters and store the updated parameters into the phone's memory. After verification of the programmed data in accordance with OTASP processing, the process is terminated. A number of different PCCs may be used for different parameters, or different groups of parameters per NAM. The PCC for a mobile unit will initially have a pre-set default value which can only be changed with user intervention to prevent unauthorized changes. As long as the PCC value remains the same, no user intervention is required for any other parameter changes which are initiated by the network service provider.

BRIEF DESCRIPTION OF THE DRAWINGS

Understanding of the present invention will be facilitated by consideration of the following detailed description of preferred embodiments of the present invention taken in conjunction with the accompanying drawings, in which like numerals refer to like parts, and in which.

DETAILED DESCRIPTION OF A PREFERRED EMBODIMENT

The following detailed description utilizes a number of acronyms which are generally well known in the art. While definitions are typically provided with the first instance of each acronym, for convenience, Table 1 below provides a list of the acronyms and abbreviations used herein along with their respective definitions.

TABLE 1

| ACRONYM | DEFINITION |
|---|---|
| A-Key | Authentication Key |
| ANSI | American National Standards Institute |
| BS | Base Station |
| CDMA | Code Division Multiple Access |
| EIA | Electronics Industries Association |
| HLC/AC | Home Location Register/Authentication Center |
| IS | Interim Standard |
| MS | Mobile Station |
| NAM | Number Assignment Modules |
| NID | Network IDentification |
| OTAPA | Over-The-Air Parameter Administration |
| OTASP | Over-The-Air Service Provisioning |
| PASO | Parameter Administration Service Option |
| PCC | Parameter Change Code |
| RAM | Random Access Memory |
| SID | System IDentification |
| SME | Signaling Message Encryption |
| SPASM | Subscriber Parameter Administration Security Mechanism |
| SPC | Service Programming Code |
| SPL | Service Programming Lock |
| SSD | Shared Secret Data |
| SSPR | System Selection for Preferred Roaming |
| TIA | Telecommunications Industry Association |

It should be noted the font variations within the specification and claims, particularly italicized text and text in all capital letters, reflect the formats established according to the various standards which are applicable to wireless communications, e.g., IS-95 and IS-683.

Figure 1:
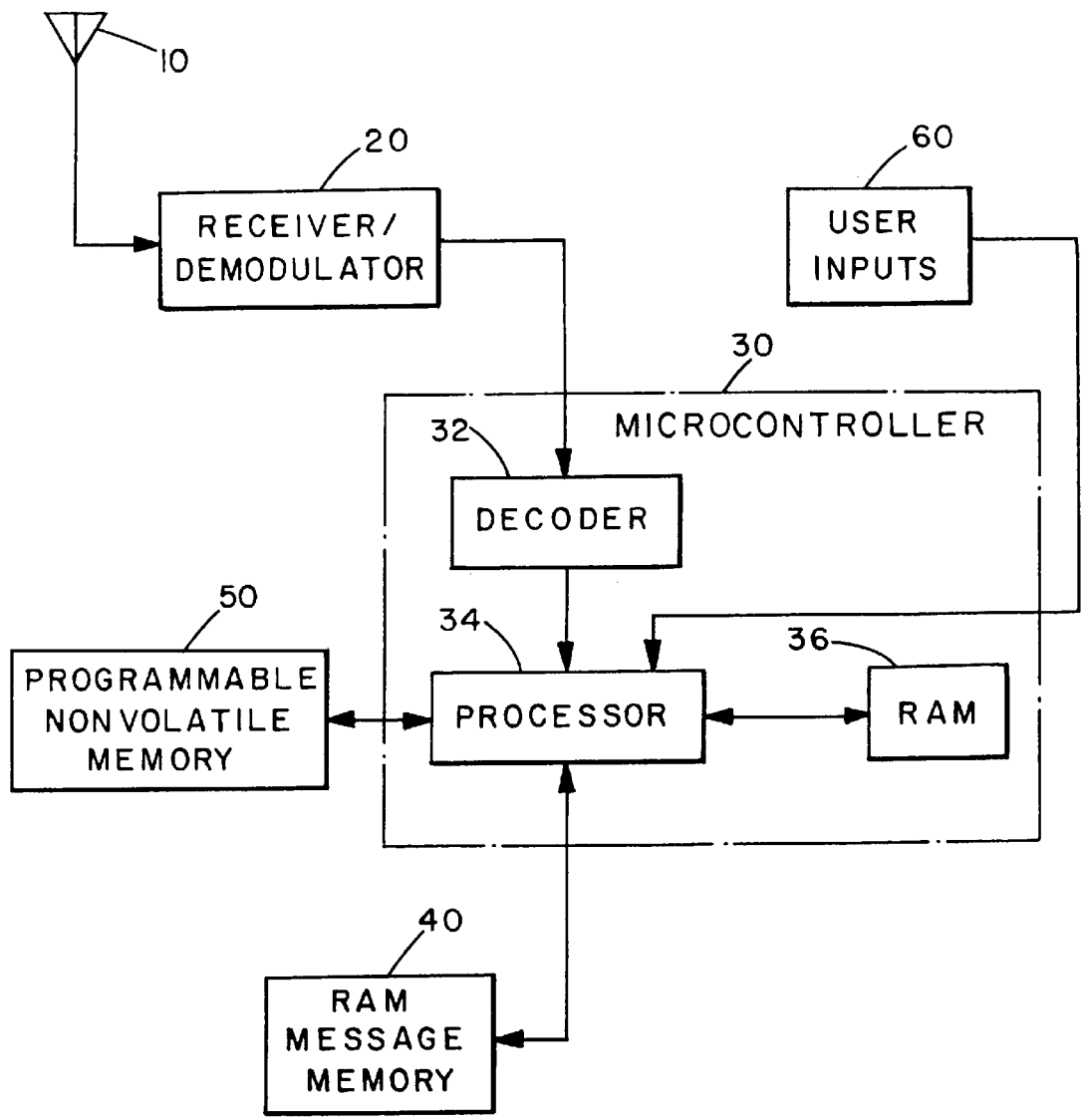
FIG. 1 is a block diagram of an exemplary mobile phone receiver.

Referring to FIG. 1, a conventional mobile phone receiver, which is generally designated by reference numeral 1, typically comprises an antenna 10 for receiving call signals. The received signals are provided to a receiver and a demodulator circuit 20 and the resulting digital signal is fed to a microcontroller 30. Microcontroller 30 comprises a decoder 32, a processor 34, and an internal RAM 36. The digital signal is decoded by the decoder 32 and processed by processor 34, which reads from or writes to internal RAM 36. Memory storage for the mobile phone parameters is provided by RAM 40. The user can enter data into processor 34 via user input circuitry 60.

A non-volatile memory 50 is coupled to processor 34 for storage of information necessary for the operation of mobile phone receiver 1. The memory can be an electrically erasable programmable read only memory (EEPROM), a battery backed up memory device, or a similar memory device which retains information even when power is not applied to the mobile phone. Processor 34 accesses information such as options for various features from non-volatile memory 50 during operation, and can alter information in the memory 50 by reprogramming in accordance with the present invention.

The procedure for Over-The-Air Parameter Administration (OTAPA) utilizes the over-the-air programming protocol and procedures which support the Over-The-Air Service Provisioning (OTASP) feature in accordance with established industry standards (TIA/EIA/IS-683). The IS-683 standard, which is incorporated herein by reference, provides the technical requirements for a network operating in either the analog or the wideband spread spectrum (CDMA) mode conforming with TIA/EIA/IS-95 or ANSI J-STD-008. The following detailed description specifically refers to a CDMA network, however, it will be apparent to those skilled in the art that by substituting the corresponding protocol and processes for analog networks according to the IS-683 standard, the inventive parameter administration method may be similarly implemented in an analog network.

Stored within the non-volatile memory 50 of mobile phone is the programming for a service option for changing the NAM parameters. This option, the Parameter Administration Service Option (PASO), includes assignment of a PASO number to the mobile unit. When the network service provider wishes to update parameters in a particular mobile unit, the base station initiates a Mobile Terminated Call by sending a General Page Message which, along with initial inquiries regarding the availability of a special service option (SPECIAL_SERVICE set to "1") and the presence of the PASO option (SERVICE_OPTION set to "1"), includes the PASO number for that mobile phone. The mobile terminated call will use a new service option, which may, for illustration purposes, be referred to as "Parameter Administration" (Service Option No. X). As in the case of any new features in a standardized systems and data formats, addition of a new service option number will requires changes to existing IS-41 (Network Specification) specified messages, or new messages will need to be defined by the standards organizations. Initiating such changes is an administrative task that will be readily apparent to those in the art.

The mobile station, which is preferably in Mobile Station Idle State with power on and CDMA system acquired, receives the page message and searches the message to determine, first, whether the base station and mobile station possess identical sets of Shared Secret Data (SSD) in accordance with standard authentication procedures, and second, the message contains the mobile unit's PASO number. At this point, no Speech Service Option is required since the procedures for the OTAPA feature only requires message exchange over the air. Assuming the authentication process is successful, if the PASO number matches, the mobile unit responds with a Page Response Message, acknowledging support for the PASO by responding to acknowledge that SPECIAL_SERVICE is set to "1" and SERVICE_OPTION X for Parameter Administration is set to "1", and sending the PASO number.

If the mobile station does not support the OTAPA option, i.e., the SERVICE_OPTION X field is set to "0", an option number will not be sent in response. If the mobile unit is engaged in another service option, e.g., voice, it may be preferable to include a response to a General Page Message containing the PASO number to indicate that the base station should remain in a Waiting for Answer Task, or should terminate the call and try later to reduce network complications.

Once the presence of the option is confirmed (SERVICE_OPTION X field is set to "1") the base station transmits a Channel Assignment Message, instructing the mobile station to proceed to the Traffic Channel. For security, the Signaling Message Encryption (SME) is used by setting ENCRYPT_MODE to "01" in the Channel Assignment Message. Because of the significant potential for fraud or other misuse of parameter change capabilities, the use of encryption is strictly enforced. Therefore, if the encryption mode is not enabled (ENCRYPT_MODE set to "00"), the mobile station will enter into the Service Negotiation process on the Traffic Channel and will reject the PASO by requesting the other service option, i.e., SERVICE_OPTION X set to "0", indicating that the PASO is not supported, or will terminate the call according to the Call Release Procedure.

In the event that standards are adopted such that the message encryption mode is not optional, but is always enabled, verification of enablement of an encryption option may not be necessary, and the above-described steps involving the paging message and response can omit the verification that the encrypt mode is enable.

Once the mobile station is on the Traffic Channel in the OTASP mode, the OTASP Data Message processing procedure is used to unlock the mobile station, update the parameters and store the updated parameters into the phone's memory as follows, then terminate the OTASP process. A number of different unlock codes may be used for different parameters, or different groups of parameters per NAM, as described in more detail below.

As specified in the IS-683 standards, delivery of OTASP Data Messages does not require sequential delivery of messages by the layer 2 protocol because OTASP procedures ensure that only one OTASP Data Message is outstanding at any time. Therefore, a Data Burst Message (OTASP BURST_TYPE) may be used in accordance with TIA/EIA/TSB58, "Administration of Parameter Value Assignments for TIA/EIA Wideband Spectrum Standards". Data Burst Messages may also be used on the Control Channel (Paging/Access Channel) per IS-95 specifications. The OTASP BURST_TYPE messages may be expanded over the control channel for OTAPA purposes.

The base station checks the mobile station's OTASP feature capability using the OTASP Data Message designated as the Protocol Capability Request Message (OTASP_MSG_TYPE field set to "00000110"), to which the mobile station responds with a Protocol Capability Response Message (with the same field setting). New feature capabilities are defined for OTAPA and may be indicated in the fields of the Protocol Capability Request/Response Messages designated as NUM_FEATURES, FEATURE_ID, and FEATURE_P_REV. The existing standards for the FEATURE_P_REV field includes reserved values for future standardization, selected values of which may be used for OTAPA standardization.

To unlock the parameters in the mobile unit, the Parameter Change Code (PCC), i.e., a password, is required. If the PCC is correct and verified by the mobile station, the parameters under the control of this PCC can be updated. A separate PCC may be assigned for different parameters or groups of parameters, e.g., NAM values or Roaming Lists may have different PCCs. The default value for PCC is "000000". In some mobile phones, if the Service Programming Lock (SPL) is supported, the PCC can be the same as the Service Programming Code (SPC) used in the SPL. The Authentication key (A-Key checksum), which is used to update SSD and, thus, is known only to the mobile station and its associated Home Location Register/Authentication Center (HLC/AC), may also be used as a PCC. The updated parameters are downloaded into the permanent memory, i.e., non-volatile memory 50. (In accordance with standard OTASP procedures, if the NAM values or other parameter values are not stored in permanent memory, they will be discarded by the mobile station.)

Data message processing involved in OTAPA follows the same procedures designated under the IS-683 for OTASP, with a difference being that initiation of the procedure does not require the intervention of the mobile user. Once the PCC is set, which does require user intervention, the network provider can change or update mobile phone parameters as long of the mobile unit is in the Idle Mode.

New OTASP Data Messages will need to be assigned by the standards organizations to support the PCC verification/change process from the base station. When the base station sends the PCC via the OTASP Data Message, the mobile station validates the PCC before allowing any parameters to be updated.

To prevent the unauthorized changing of a PCC from the default value to a non-default value, subscriber authorization is required. Thus, when the base station sends the OTASP Data Message to change the PCC from default to non-default, the mobile station must always wait for the user's authorization before any change(s) in the PCC(s) can take place.

After the network service provider has updated the desired parameters, the OTASP data commit procedure using the Commit Request Message (OTASP_MSG_TYPE set at "00000101") is used to make the new parameters effective and to terminate the OTAPA call. Depending on the nature of the changes, some parameters may require the mobile station to run through a power cycle before the parameter is activated.

Figure 2:
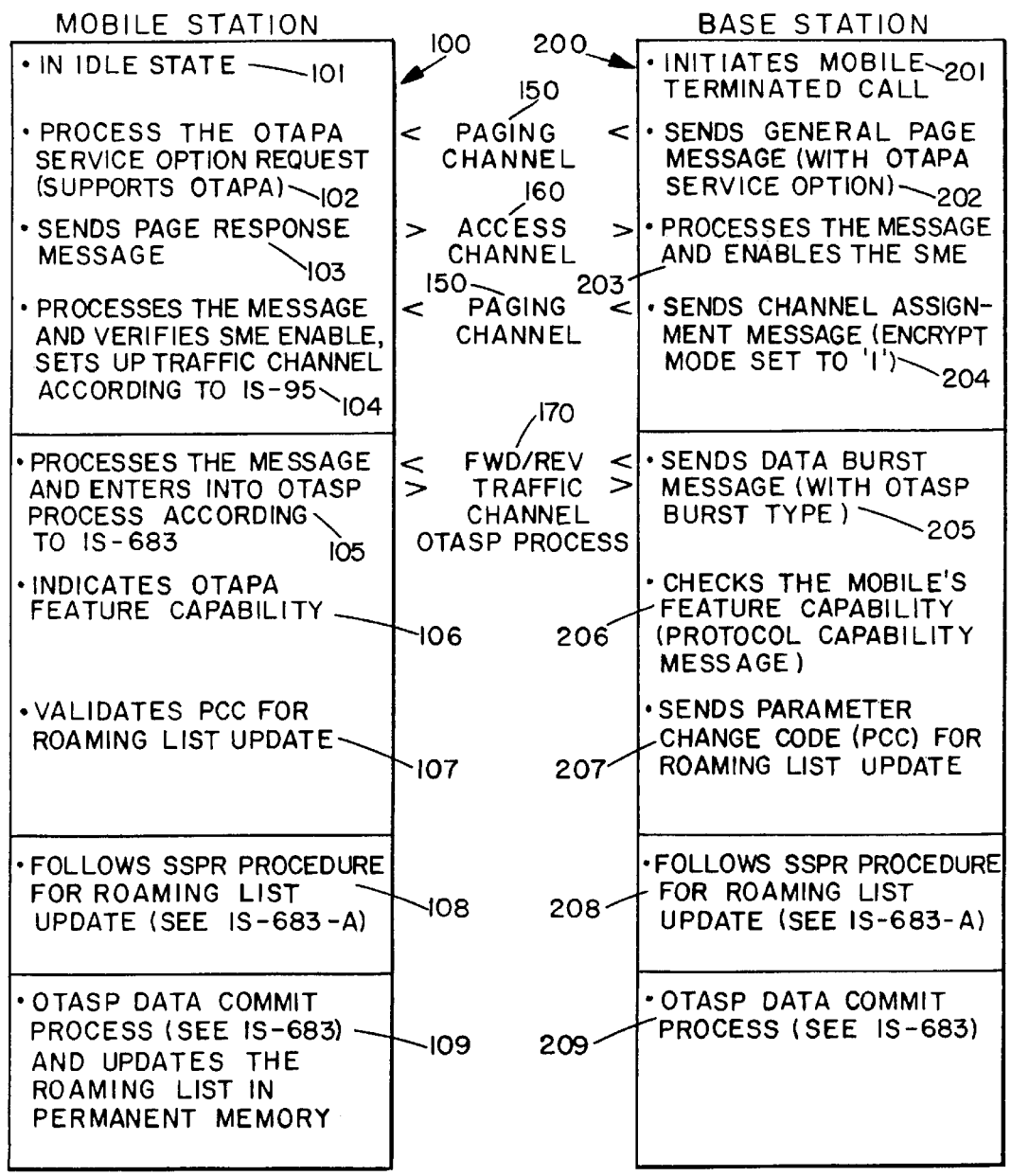
FIG. 2 is a diagram of an exemplary OTAPA call flow for changing a Roaming List according to the present invention.

FIG. 2 provides an exemplary call flow for changing the Roaming List parameters. In accordance with IS-95, the mobile station has a list of one or more home (non-roaming) (SID,NID) pairs (network identification (NID) and system identification (SID)). A change in the Roaming List would be initiated if, for example, two cellular systems merged or established an arrangement which permitted their subscribers to travel between the two systems without incurring roaming charges, or if a new network were added within the cellular system to which the mobile user subscribes. The following assumptions apply:

1) The Mobile Station and Base Station each supports the OTAPA service option:
2) The Mobile Station is powered up and the user is not talking on the phone (not in voice mode);
3) The Base Station and the Mobile Station have already performed the Authentication process successfully (in accordance with established authentication procedures under IS-95);
4) The Base Station (Network) supports Signaling Message Encryption (SME), including authentication; and
5) The Parameter Change Code (PCC) of Roaming List update is programmed into the Mobile Station.

In FIG. 2, the Mobile Station is generally designated as 100 and the Base Station as 200. Mobile Station 100 is in the Idle State 101 when, at the direction of the Network Service Administrator, Base Station 200 initiates a Mobile terminated call 201 on Paging Channel 150, sending a General Page Message 202 which includes the OTAPA service option (SERVICE_OPTION X set to "1"). Mobile Station 100 receives the page message and processes the OTAPA Service Option request 102. Per the assumptions, Mobile Station 100 supports the OTAPA Service Option. Mobile Station 100 responds on Access Channel 160, sending a Page Response Message 103 confirming the mobile's support of the OTAPA Service Option. Base Station 200 Process the Page Response Message and enables the Signaling Message Encryption (SME) 203 and, still on Paging Channel 150, sends a Channel Assignment Message 204 which includes the encryption mode turned on (ENCRYPT_MODE set to "01"). Mobile Station 100 processes the Channel Assignment Message and verifies the SME, then sets up the designated Traffic Channel 170 according to IS-95 procedures 104.

Base Station 200 sends a Data Burst Message using OTASP BURST-TYPE fields 205 and transmits the message to Mobile Station 100 over Traffic Channel 170. This message includes a Protocol Capability Request Message. (All subsequent communications for this procedure occur over Traffic Channel 170.) Mobile Station 100 processes Data Burst Message 205 and enters into the OTASP process according to IS-683 (step 105), and responds to indicate OTAPA feature capability 105 by sending a Protocol Capability Response Message in step 106. In step 206, Base Station 200 transmits the Parameter Change Code (PCC) for the Mobile Station 100. If the Mobile Station has more than one PCC, the Base Station 200 will specifically select the PCC for updating the Roaming List. Assuming the PCC is correct, Mobile Station 100 receives and validates the transmitted PCC.

Still communicating over Traffic Channel 170, in steps 207 and 107, Base Station 200 and Mobile Station 100, respectively, follow the System Selection for Preferred Roaming (SSPR) procedure for Roaming List update as set forth in IS-683-A. After the updated roaming information is fully downloaded, in step 208, Base Station 200 initiates the OTASP Data Commit process by sending a Data Commit Message (OTASP_MSG TYPE field set to "00000101") in accordance with IS-683, telling Mobile Station 100 to process and update the Roaming List. Mobile Station receives the Data Commit Message and sets the field of the data commit result code to indicate acceptance of the Data Commit Message (RESULT_CODE set to "00000000") and to store the new data in permanent memory. (Note that, in accordance with IS-683), if any errors are detected in the data, the RESULT_CODE will be set to the appropriate value to indicate the nature of the error.) After acceptance is indicated by Mobile Station 100, the call is released.

The Over-The-Air Parameter Administration method of the present invention provide the advantage of allowing a network service provider to initiated over-the-air access to a mobile station's Number Assignment Module (NAM) without requiring user intervention, allowing for actions to be taken to protect the service provider's resources as well as to improve service to its subscribers. The strict enforcement of encryption procedures provides means for preserving security and integrity of NAM parameters to prevent unauthorized access, including unauthorized switching of service providers or "slamming". The inventive procedure also may be useful in assisting in the deterrence and apprehension of persons who have hijacked a subscriber's account by stealing their mobile phone or by intercepting and using a transmission from a mobile station. The OTAPA procedure can be initiated using existing OTASP protocols and procedures, requiring minimal changes to standards.

Other embodiments and modifications of the present invention will occur readily to those skilled in the art in view of these teachings. Therefore, this invention is to be limited only by the following claims, which include other embodiments and modifications when viewed in conjunction with the above specification and accompanying drawings.

I claim:

1. A method for making changes in at least one of a plurality of operating parameters of a mobile phone which operates within a network, the plurality of operating parameters being stored within a non-volatile memory, the method comprising:

providing an encryption means for securing communications between the mobile phone and the network;

programming the mobile phone with a parameter change service option and at least one parameter change code for permitting over-the-air changing of operating parameters;

transmitting a page message from a base station within the network to the mobile phone, the page message including an inquiry as to the identity of the mobile phone and the presence of the parameter change service option;

transmitting a page response message from the mobile phone to the base station verifying the identity of the mobile phone and the presence of the parameter change service option;

transmitting instructions from the base station to the mobile phone to enter an over-the-air service provisioning process;

transmitting the at least one parameter change code from the base station to the mobile phone;

transmitting from the mobile phone to the base station a response verifying the at least one parameter change code;

downloading updated operating parameters corresponding to the at least one parameter change code from the base station to the mobile phone;

storing the updated operating parameters in the non-volatile memory; and transmitting from the base station to the mobile phone a call releasing message.

2. The method of claim 1, wherein the encryption means comprises a programmable encryption mode and the step of programming the mobile phone includes programming the programmable encryption mode to enable message encryption.

3. The method of claim 2, wherein the page message includes an inquiry to confirm that the programmable encryption mode is enabled.

4. The method of claim 1, wherein the encryption means comprises a permanent encryption code for encrypting all communications between the mobile phone and the base station.

5. The method of claim 1, wherein the plurality of operating parameters are divided into a plurality of parameter groups and wherein said at least one parameter change code comprises a plurality of parameter change codes with one parameter change code corresponding to each parameter group of the plurality of parameter groups.

6. The method of claim 1, wherein the at least one parameter change code is an authentication key for the mobile phone.

7. The method of claim 1, wherein the step of determining whether the mobile phone is set up for message encryption comprises:

transmitting a channel assignment message from the base station to the mobile phone wherein the channel assignment message has an encryption mode turned on; and transmitting a response from the mobile phone to the base station verifying that the encryption mode is turned on.

8. The method of claim 1, wherein the step of programming the mobile phone comprises assigning one service option number from a plurality of service option numbers for the parameter service option and setting the value of the one service option number to "1".

9. The method of claim 8, wherein the page response message includes a field containing the one service option number.

10. The method of claim 1, wherein the at least one parameter change code has a pre-set value.

11. The method of claim 10, wherein the pre-set value of the at least one parameter change code may be changed to a different value only by intervention of a user of the mobile phone.

12. The method of claim 1, wherein the step of downloading updated operating parameters includes downloading the updated operating parameters using the over-the-air service provisioning process according to the IS-683 standard.

13. A method of claim 1, wherein the step of determining whether the mobile phone is set up for message encryption further includes transmitting a channel assignment message to the mobile phone.

14. The method of claim 1, wherein the step of transmitting instructions to enter an over-the-air service provisioning process includes transmitting data burst messages.

15. A wireless communications network having a base station with a service administrator, and a mobile station, the mobile station having a plurality of operating parameters stored within a non-volatile memory, at least a portion of the plurality of operating parameters which may be changed by the service administrator, the network comprising:

message encryption means for securing communications between the base station and the mobile station;

means for programming the memory of the mobile station wherein the mobile station has programmable options for over-the-air parameter changes, the mobile station being set to enable the programmable options;

means for initiating a call from the base station to the mobile station when the mobile station is in an idle mode, the call comprising a paging message for interrogating the mobile station to confirm a mobile station identity and that the programmable options for over-the-air parameter changes are enabled;

means for terminating the call if the programmable options for over-the-air parameter changes are not enabled;

means for instructing the mobile phone to enter into an over-the-air service provisioning process;

means for enabling a download of updated operating parameters from the base station to the mobile station including transmitting a parameter change code portion within the programmable options for over-the-air parameter changes;

means for storing the updated operating parameters in the non-volatile memory; and means for terminating the call.

16. The network of claim 15, wherein the message encryption means comprises a programmable encryption mode and the means for programming the memory of the mobile station includes means for programming the programmable encryption mode to enable message encryption.

17. The network of claim 16, wherein the paging message includes an inquiry to confirm that the programmable encryption mode is enabled.

18. The network of claim 15, wherein the message encryption means includes a permanent encryption code for encrypting all communications between the mobile station and the base station.

19. The network of claim 15, wherein the over-the-air service provisioning process is in accordance with the IS-683 standard.

20. The network of claim 15, wherein the plurality of operating parameters are divided into a plurality of parameter groups and each parameter group of the plurality has a corresponding parameter change code.

21. The network of claim 15, wherein the parameter change code is an Authentication key for changing a Shared Secret Data set of the mobile station.

22. The network of claim 15, wherein the paging message includes a channel assignment message from the base station to the mobile phone wherein the channel assignment message has an encryption mode turned on and a response message from the mobile phone to the base station verifying that the encryption mode is turned on.

23. The network of claim 15, wherein the means for programming includes a data field having a plurality of service option numbers including one service option number corresponding to a parameter service option for over-the-air parameter changes and setting the value of the one service option number to "1".

24. The network of claim 15, wherein the parameter change code portion has a pre-set value.

25. The network of claim 24, wherein the pre-set value of the parameter change code portion may be changed to a different value only by intervention of a user of the mobile station.

26. A method for administering a wireless communications network comprising a base station and a plurality of mobile phones, each mobile phone having an identity and a plurality of operating parameters stored in a non-volatile memory, at least a portion of the operating parameters which require updating, wherein a user of the mobile phone is not required to initiate a procedure for updating the operating parameters, the method comprising:

programming the mobile phone with a parameter change service option and at least one parameter change code for permitting over-the-air changing of operating parameters;

when an update to the operating parameters is required, transmitting a General Page Message from a base station to the mobile phone in an Idle Mode, the General Page Message including a request to verify the identity of the mobile phone and a first data field for the parameter change service option;

receiving a Page Response Message from the mobile phone to the base station including the identity of the mobile phone and the first data field for the parameter change service option;

transmitting a Channel Assignment Message from the base station to the mobile phone, the Channel Assignment Message including a second data field for message encryption and instructing the mobile phone to set up a traffic channel;

receiving a response from the mobile phone including the second data field to verify message encryption;

terminating the transmission from the base station if message encryption is not verified;

transmitting a Data Burst Message from the base station to the mobile phone instructing the mobile phone to enter an over-the-air service provisioning process;

transmitting a Protocol Capability Request Message from the base station to the mobile phone, the Protocol Capability Request Message including a third data field for feature capability of the mobile phone;

receiving a Protocol Capability Response Message from the mobile phone indicating the third data field;

transmitting the at least one parameter change code from the base station to the mobile phone;

transmitting from the mobile phone to the base station a response verifying the at least one parameter change code;

downloading updated operating parameters corresponding to the at least one parameter change code from the base station to the mobile phone; and transmitting a Data Commit Message from the base station to the mobile phone for storing the updated operating parameters in the non-volatile memory and for releasing the call.

27. The method of claim 26, wherein the at least one parameter change code has a pre-set value.

28. The method of claim 27, wherein the pre-set value of the at least one parameter change code may be changed to a different value only by intervention of a user of the mobile phone.

29. The method of claim 26, wherein the step of downloading updated operating parameters includes downloading the updated operating parameters using the over-the-air service provisioning process according to the IS-683 standard.

30. The method of claim 26, wherein the at least one parameter change code is an A-key for changing a set of Shared Secret Data for the mobile phone.

* * * * *